Oct. 3, 1933.  S. M. ACTON  1,928,873

COMBINED FLASH STOP SIGNAL AND TAIL LIGHT

Filed May 8, 1931

INVENTOR.
STANLEY M. ACTON
BY Allen & Allen
ATTORNEYS

Patented Oct. 3, 1933

1,928,873

UNITED STATES PATENT OFFICE 1,928,873

COMBINED FLASH STOP SIGNAL AND TAIL LIGHT

Stanley M. Acton, Springfield Township, Hamilton County, Ohio

Application May 8, 1931. Serial No. 535,926

1 Claim. (Cl. 177—337)

My invention relates to signal lights for motor vehicles, and more especially to lights for signaling at the rear of the vehicle when the vehicle is to be stopped.

An object of my invention is to provide for automatically giving a flashing signal upon operation of a part of the vehicle involved in the stoppage of the vehicle. A further object is to provide such a device in such a way that the light will continue to be displayed continuously as a tail light. A further object is to provide such a vehicle with two such lights, one at each side which may alternately be flashed as a stop signal, and either one of which will remain continuously displayed as a tail light upon cessation of the stop signal. Other objects will appear in the course of the following description.

In the drawing:—

Motor vehicles ordinarily are provided with a simple stop or tail light to be noticed by a driver following the vehicle, so that when stoppage of the vehicle is about to occur, the following driver may observe this and stop or slow down his car accordingly. In congested traffic, especially in city streets, where also the streets are lighted and these ordinary lights do not afford very much contrast, the following driver may easily fail to note the rate of movement or stoppage of the vehicle in front. It is my purpose to provide a signal which will not only be readily noticeable, but which even will attract the attention of the following driver even in such conditions as above mentioned, where the traffic is congested and the surrounding lighting otherwise would detract from the effectiveness of the ordinary signal. Also because the ordinary tail light or stop signal is usually constantly displayed without regard to speed or stoppage of the vehicle, it is not always effective in accomplishing the above purposes. If not constantly displayed and the driver is depended upon to cause its display upon slowing down or stopping, the driver usually will forget to cause its display. I am aware that various devices have been suggested for overcoming these difficulties, which, however, involve considerable undesirable complication, with corresponding expense of construction and maintenance.

With the object of avoiding the above disadvantages, I provide for a flashing effect of a stop signal, and preferably cause this by a commutating device which is operated by a small motor. I also provide means for controlling the current to the lamp and the current to the motor by a very simple switching means. I further provide, for actuating this switch, means by or in conjunction with the operation of one of the mechanisms of the motor vehicle used in the slowing down or stoppage thereof; that shown herein being the pedal which operates the vehicle brake. I also provide means for making the stop signal lamp serve as a tail light, and preferably the stop signal is made up of two lamps at respective sides of the rear of the vehicle, and the commutating device is so related to these lamps that in its operation it alternately lights these lamps, so that first one lamp and then the other flashes, with a repetition of these flashes as long as the vehicle stopping means is functioning. When two lamps are so provided, the means for constituting one of the lamps, a tail light, is operative to have this effect on whichever one of the lamps is receiving current at the time the vehicle-stopping function ceases.

It will be understood, however, that one or more of these provisions may be absent from a device which will come within the scope of my invention as defined by the claims herein.

Figure 1:
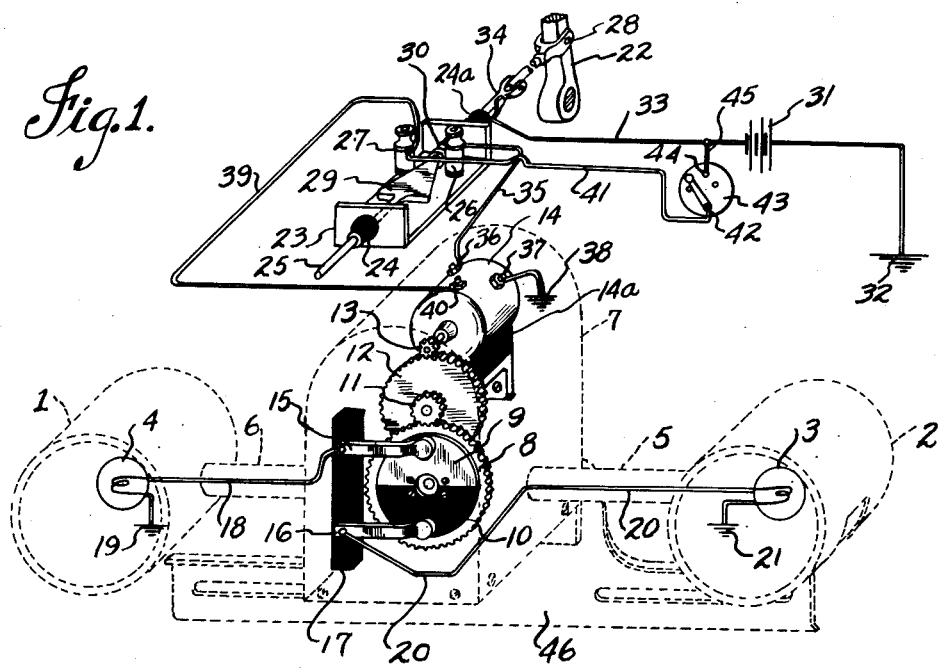
Fig. 1 is a diagrammatic perspective view illustrating my device incorporated with the brake pedal of a motor vehicle in such a manner that when the brake pedal is operated to stop the vehicle the stop light will be displayed.
Figure 2:
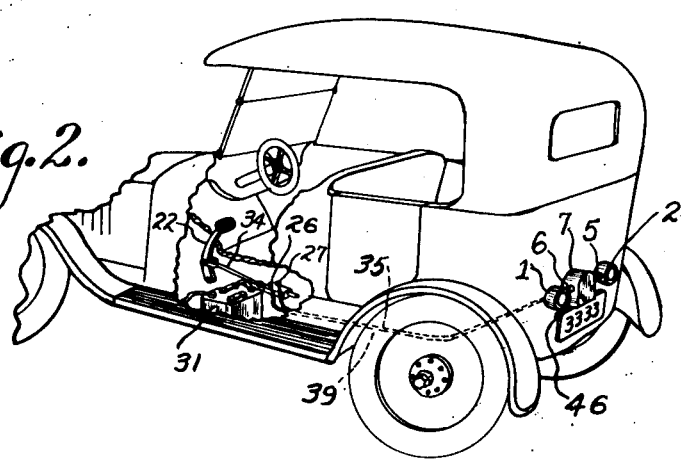
Fig. 2 is a perspective view of part of a motor vehicle with my signal installed thereon.

In the specific example illustrated, the casings 1 and 2, for the respective lamps 3 and 4, illustrated diagrammatically in Fig. 1, are located near the respective sides of the rear of the vehicle on the ends of conduit tubes 5 and 6 respectively, which open into the casings, and which have their inner ends fastened in the sides of the lower part of a metal mechanism casing 7, into which these tubes open.

The mechanism within the casing 7 comprises the commutating disc 8, which has one-half 9 of its circular face of conductive material, while the other one-half 10 is of insulating material. On the periphery of this disc 8 are teeth meshing upwardly with the pinion 11 concentric with and fixed to the gear 12, which, in turn, meshes upwardly with the pinion 13, fixed on the shaft of the motor 14. This motor is mounted on an insulating base 14a, whereby its frame parts are insulated from the casing 7 and its associated conduits 5 and 6 and lamp casings 1 and 2; but it will be understood that the frame of this motor 14 is electrically continuous with its shaft and the gearing just described, and the conductive face 9 of the disc 8. Two contact tongues 15 and 16 are mounted on an insulating base 17 on the interior of one side of the casing 7; these tongues projecting across the casing respectively above and below the axis of the commutating disc 8, so that always when one tongue contacts the conductive part 9 of the disc, the other tongue contacts the insulating part 10. The tongue 15 is connected to one terminal of the lamp 4, by the conductor 18; the other terminal of this lamp being grounded to the lamp casing 1, as indicated at 19. The other tongue 16 is connected to one terminal of the other lamp 3 by the condutor 20; the other terminal of this lamp being grounded to the lamp casing 2 as indicated at 21.

The automatic controlling switch located near the vehicle brake lever 22, comprises a base 23, with bearing lugs 24 and 24a at its opposite ends, in which a rod 25 is slidable horizontally; the rod 25 being understood to be insulated from two binding posts 26 and 27, also mounted on the base 23. This rod 25 extends past one of its bearings 24a, and has a pivotal connection 28 with the brake lever 22 so related to the fulcrum of the lever 22 that when the lever is swung to apply the brake, the lever pulls on the rod 25. The wedge-shaped connecting element 29 is fixed on the rod 25 with its converging sides toward the posts 26 and 27, which are respectively above and below the rod 25; and a helical spring 30 around the rod 25, is compressed between this member 29 and the rod bearing 24a at the adjacent end of the base 23. Thus operation of the brake pulls the connecting element 29 between the posts 26 and 27, wedging it therebetween and establishing a firm contact; but when the brake is released, the spring 30 will return the member 29 away from the posts 26 and 27, out of connecting position.

The battery 31 is indicated only diagrammatically in Fig. 1 as a primary battery; but it will be understood that it may be one of the batteries forming the usual equipment of the vehicle, usually a storage battery, or this source of current may be the magneto or the lighting dynamo, if the vehicle be so equipped. One terminal of this battery 31 is grounded, as indicated at 32 in Fig. 1; it being understood that such grounding would be to the vehicle frame, or other part effective for this purpose. From the opposite terminal of the battery 31, the conductor 33 leads to contact member 34, on the bearing 24a of the switch rod 25; this contact member 34 bearing against the rod 25 as the rod slides. From the inner post 26 of the switch the conductor 35 leads to one terminal 36 of the motor 14; the other terminal 37 of the motor being grounded to the mechanism casing 7 as indicated at 38. From the outer post 27 of the switch the conductor 39 leads to the frame of the motor 14, to which it is connected at 40, which frame, as before explained, is electrically continuous through the gearing with the conductive part 9 of the commutating disc 8.

Another conductor 41 leads from the outer post 27 to one terminal 42 of the hand switch 43; the other terminal 44 of this switch being connected by the conductor 45 with the conductor 33 that connects the battery 31 with the switch rod 25.

Suitable mounting of the switch mechanism for connection with the brake lever 22 as described, will be understood though not disclosed in detail; and also the mounting of the mechanism casing 7 and its associated lamp casings 1 and 2 on the rear of the vehicle will be readily understood without detailed illustration. Preferably I provide on the bottom of this rear casing assembly, a suitable horizontally slotted holder 46 for the rear license tag of the vehicle.

When the vehicle is to be stopped or slowed down, the driver presses on the brake lever 22, pulling the contact element 29 against the posts 26 and 27, upon which a circuit is completed, including, from the battery 31, the conductor 33, contact member 34, switch rod 25 and element 29, lower post 26, conductor 35, and through the motor, from one terminal 36 to the other terminal 37, and to ground at 38; thus energizing the motor and starting the operation of the mechanism in the casing 7, with the disc 8 thus rotated presenting its conductive part 9 alternately to the tongues 15 and 16. When the part 8 contacts the tongue 15 a circuit is completed from the battery 31, through conductor 33, contact member 34, switch rod 25 and element 29, lower post 27, conductor 39, to motor frame 14 at 40, through the mechanism and the disc part 8, tongue 15 and conductor 18, through lamp 4, to ground at 19. When the part 8 contacts the other tongue 16 the circuit is the same, except that now it is from the part 8, through the tongue 16 and conductor 20, through the other lamp 3, to ground at 21. Thus as long as the switch element 29 contacts the two posts 26 and 27, the commutating disc 8 will be rotated by the motor 14, and the circuit alternately will be completed through the two lamps 3 and 4; and this operation will cease as soon as the element 29 recedes from the posts 26 and 27 upon release of the brake.

Of course, the disc 8 will always stop with one or the other tongue 15 or 16 in electrical contact with its conductive part 9, or at least partly in contact therewith. So that both tongues may be in contact with the part 9 should the disc stop with its division between the parts 8 and 10 upright, care is taken to continue the tongues 15 and 16 amply to one side of this diameter of the disc. I take advantage of this insured contact of one or the other tongue with the conductive part 9 to cause the display of one or the other lamp 3 or 4, depending upon which tongue 15 or 16 the part 9 contacts upon stoppage. I accomplish this by closing the switch 43; whereupon the circuit is from the battery, through conductor 45, switch 43, conductor 41, post 27, conductor 39, to motor frame 14 at 40, and from there through the mechanism including the disc part 9, and whichever tongue 15 or 16 is contacting therewith, through the lamp 3 or 4, to ground at 19 or 21, as the case may be. It will be seen, therefore, that all the driver has to do in order to display the tail light is to close the switch 43, which will keep one or the other lamp 3 or 4 displayed as a constantly appearing tail light, but ready to take part in the alternating display upon application of the brake and closing of the switch connected thereto, as before described.

While I have rather specifically illustrated and described my invention, it will be understood that modifications may occur, and therefore I do not wish to be limited to such precise disclosure, but what I claim as new and desire to secure by Letters Patent, is:—

In a combined flash stop signal and tail light for vehicles, two lamps, a rotary member having an electrical contact surface extending substantially half way around its center of rotation, electrical contact elements connected to the respective lamps and arranged at diametrically opposite sides of said center of rotation in positions whereby they are alternately contacted by said contact surface upon rotation of said member and one or the other contact element will be contacted by said contact surface when said rotation is stopped, an electric motor means to rotate said member, a source of current, electrical connections to said source and to said motor and said contact surface, respectively, comprising a switch arranged to make or break connection of said source to said motor and said contact surface simultaneously, and an electrical connection from said source to said contact surface, comprising a switch to connect said source to said contact surface independently of the first mentioned switch.

STANLEY M. ACTON.